(12) United States Patent
Seki et al.

(10) Patent No.: US 9,835,919 B2
(45) Date of Patent: Dec. 5, 2017

(54) DISPLAY DEVICE INCLUDING A PLURALITY OF METAL LINES IN CONTACT WITH A COMMON ELECTRODE

(71) Applicant: Japan Display Inc., Minato-ku (JP)

(72) Inventors: Kenta Seki, Tokyo (JP); Gen Koide, Tokyo (JP); Yuji Maede, Tokyo (JP); Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/275,682

(22) Filed: Sep. 26, 2016

(65) Prior Publication Data

US 2017/0102597 A1   Apr. 13, 2017

(30) Foreign Application Priority Data

Oct. 13, 2015 (JP) ................. 2015-201909

(51) Int. Cl.
| | |
|---|---|
| *G02F 1/1339* | (2006.01) |
| *G02F 1/1335* | (2006.01) |
| *G02F 1/1368* | (2006.01) |
| *G02F 1/1362* | (2006.01) |
| *G02F 1/1343* | (2006.01) |
| *G02F 1/1333* | (2006.01) |

(52) U.S. Cl.
CPC .... *G02F 1/136286* (2013.01); *G02F 1/13394* (2013.01); *G02F 1/133308* (2013.01); *G02F 1/133514* (2013.01); *G02F 1/134309* (2013.01); *G02F 2001/136218* (2013.01); *G02F 2201/121* (2013.01)

(58) Field of Classification Search
CPC .. G02F 1/1339; G02F 1/1337; G02F 1/13394; G02F 2001/13396
See application file for complete search history.

(56) References Cited

U.S. PATENT DOCUMENTS

| | | | |
|---|---|---|---|
| 8,629,451 B2 * | 1/2014 | Kawamura | ............. H01L 27/12 257/59 |
| 9,367,165 B2 | 6/2016 | Araki et al. | |
| 2017/0123247 A1 * | 5/2017 | Hirota | ................... G02F 1/1337 |
| 2017/0192279 A1 * | 7/2017 | Maede | ................ G02F 1/13394 |

FOREIGN PATENT DOCUMENTS

JP    2015-75605    4/2015

* cited by examiner

*Primary Examiner* — Tracie Y Green
(74) *Attorney, Agent, or Firm* — Oblon, McClelland, Maier & Neustadt, L.L.P.

(57) ABSTRACT

According to one embodiment, a display device comprises metal lines which are in contact with a structural electrode. A first filter overlaps with first and second pixels, and a second filter overlaps with second and fourth pixels. First to fourth structural electrodes overlap with first to fourth pixels respectively. A first slit extends between first and second pixels, and a second slit extends between third and fourth pixels. The first metal line is formed between first and second structural electrodes to cover part of the first slit, and the second metal line is formed between third and fourth structural electrodes to cover part of the second slit.

16 Claims, 13 Drawing Sheets

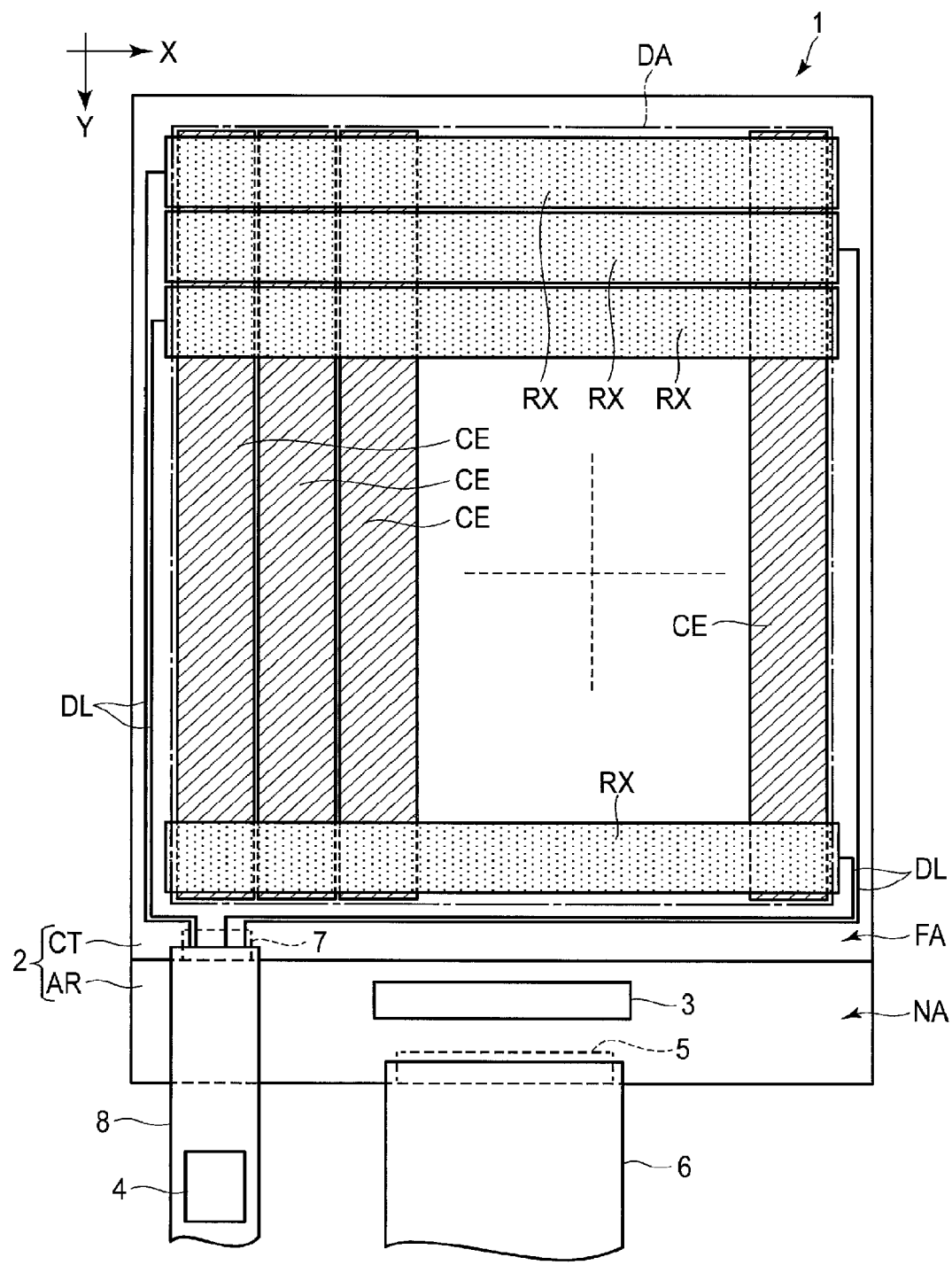
F I G. 1

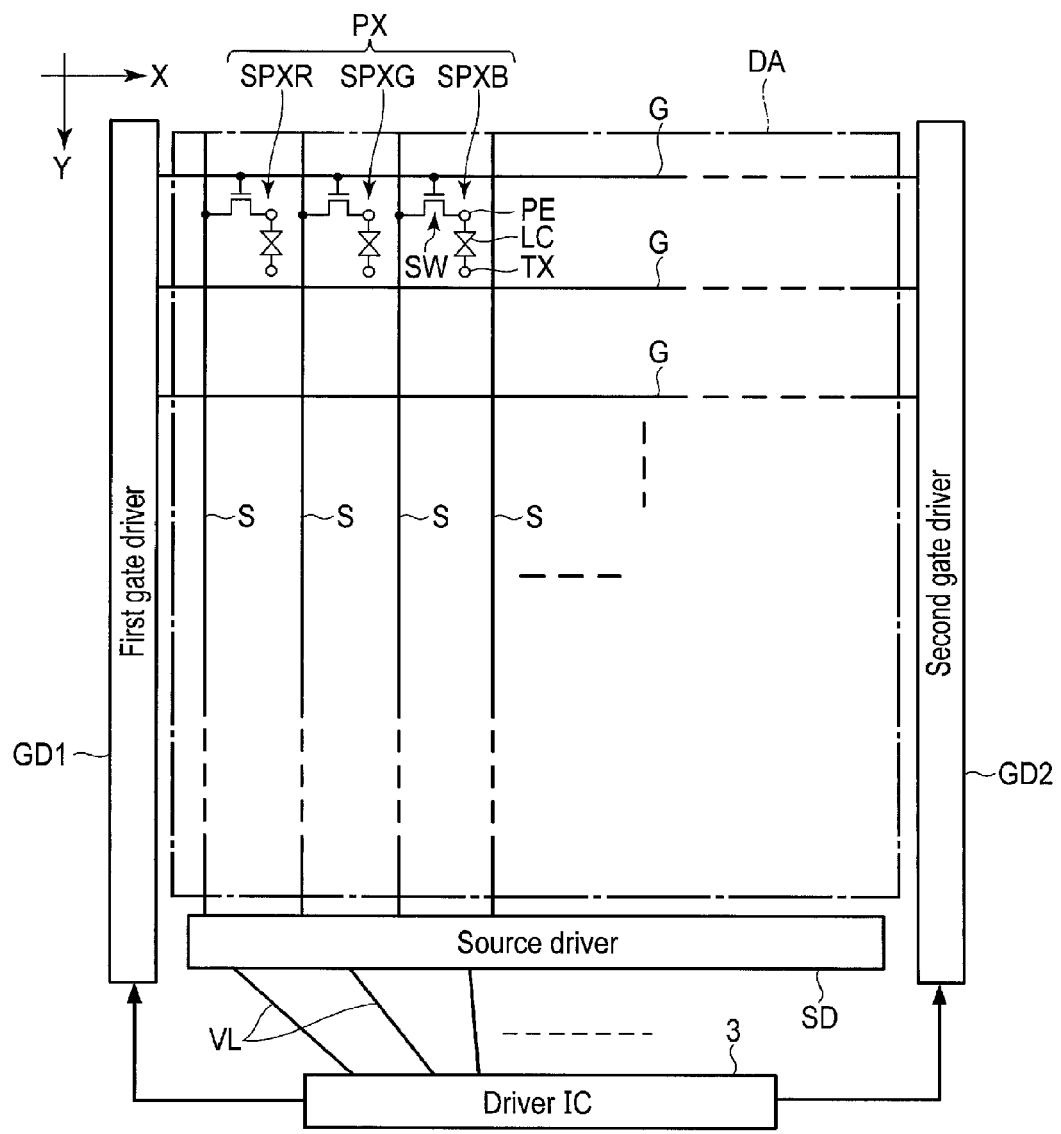
F I G. 2

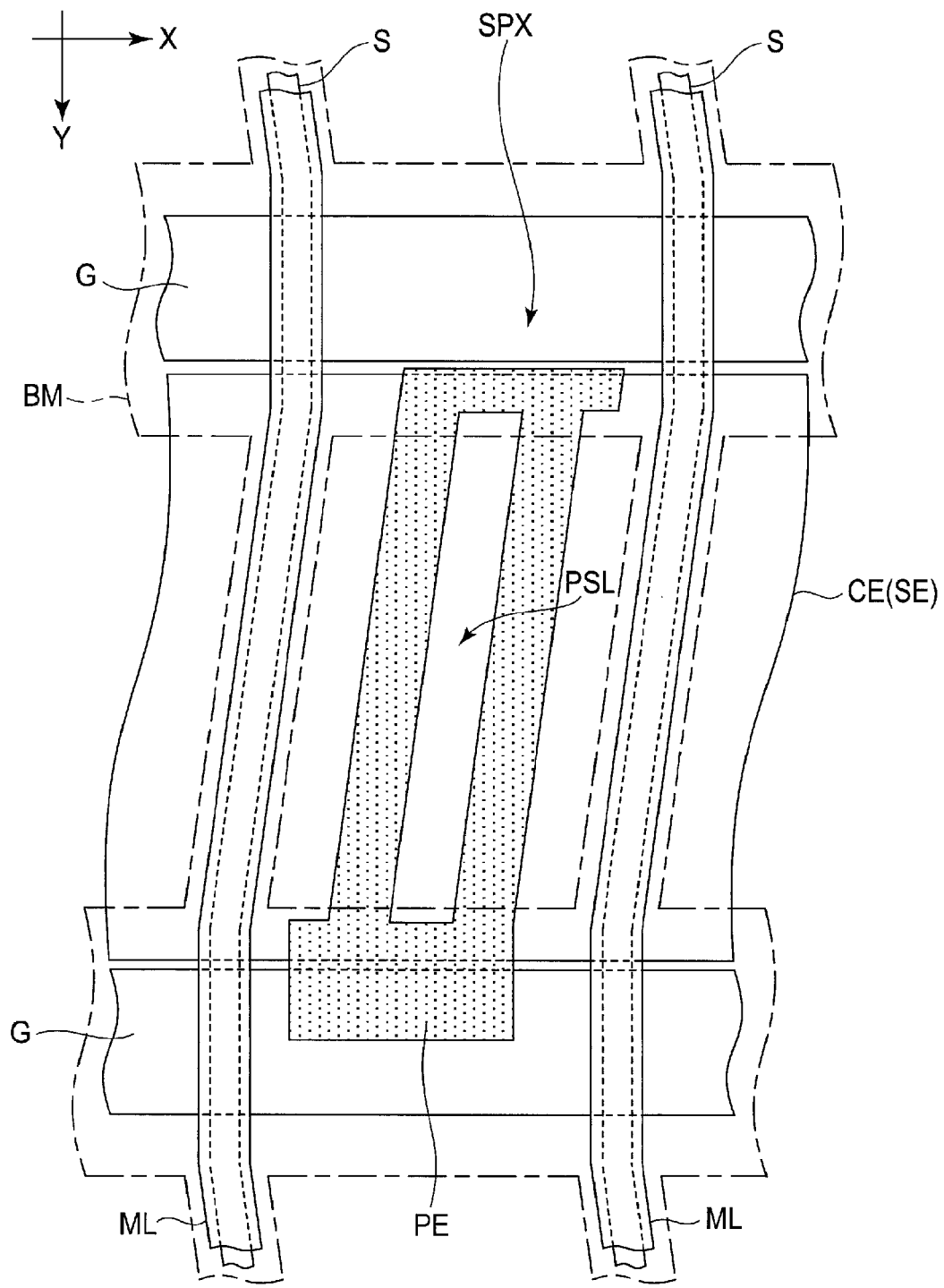
F I G. 4

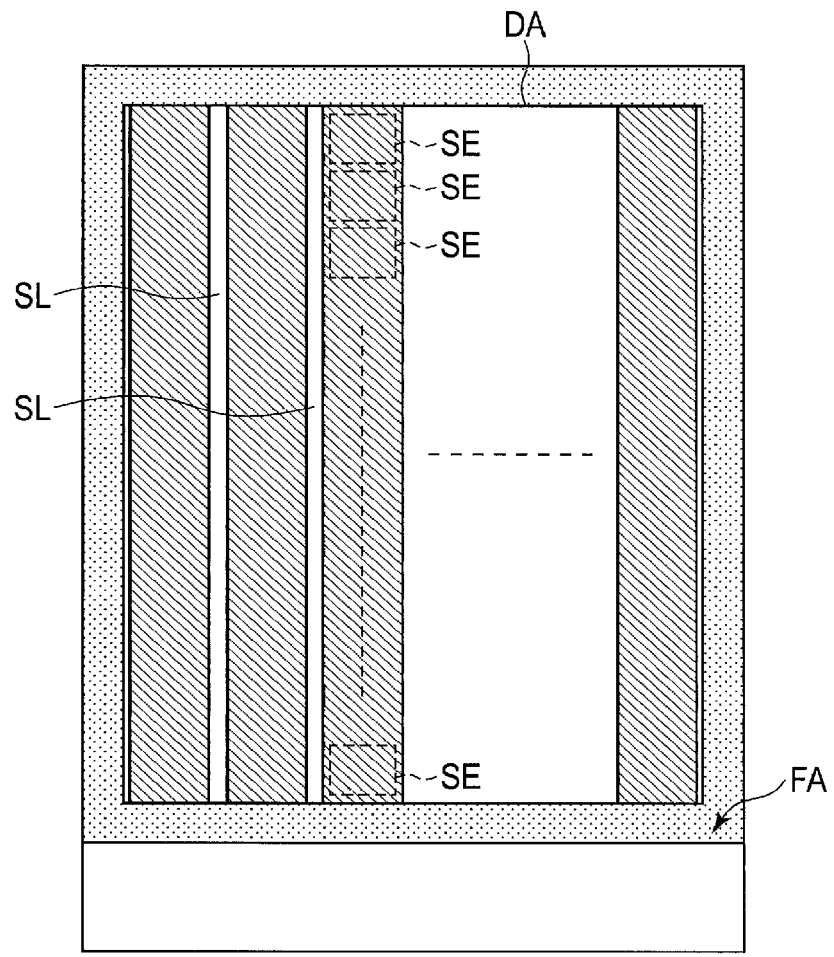
F I G. 6

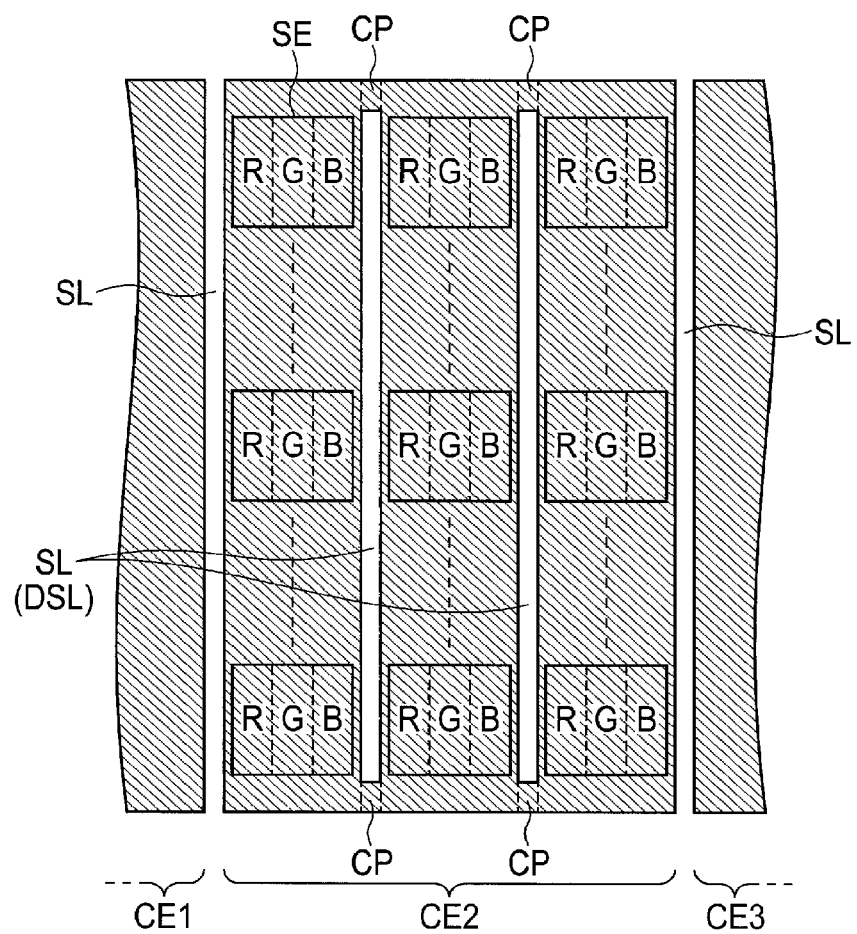
F I G. 7

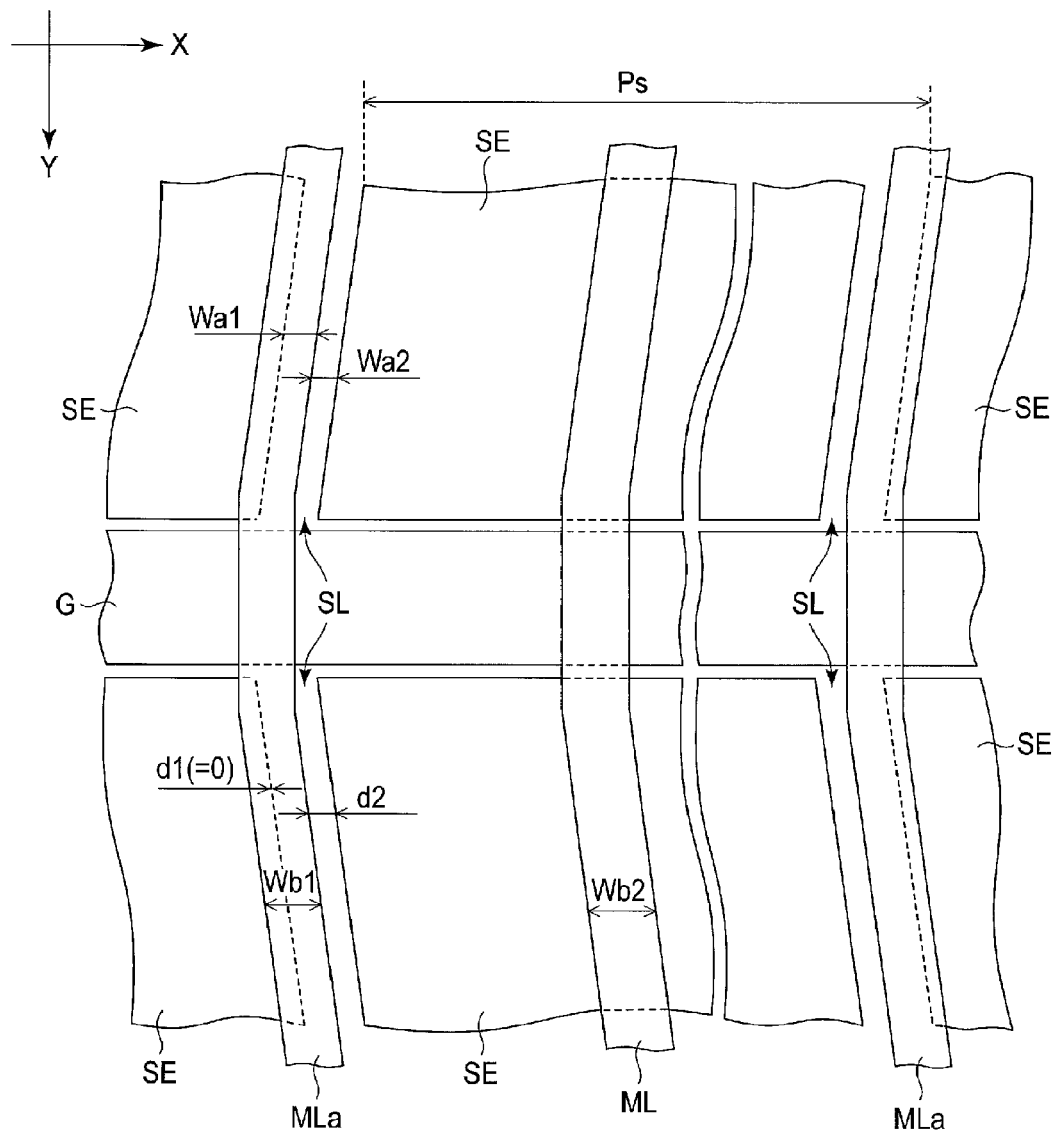
F I G. 9

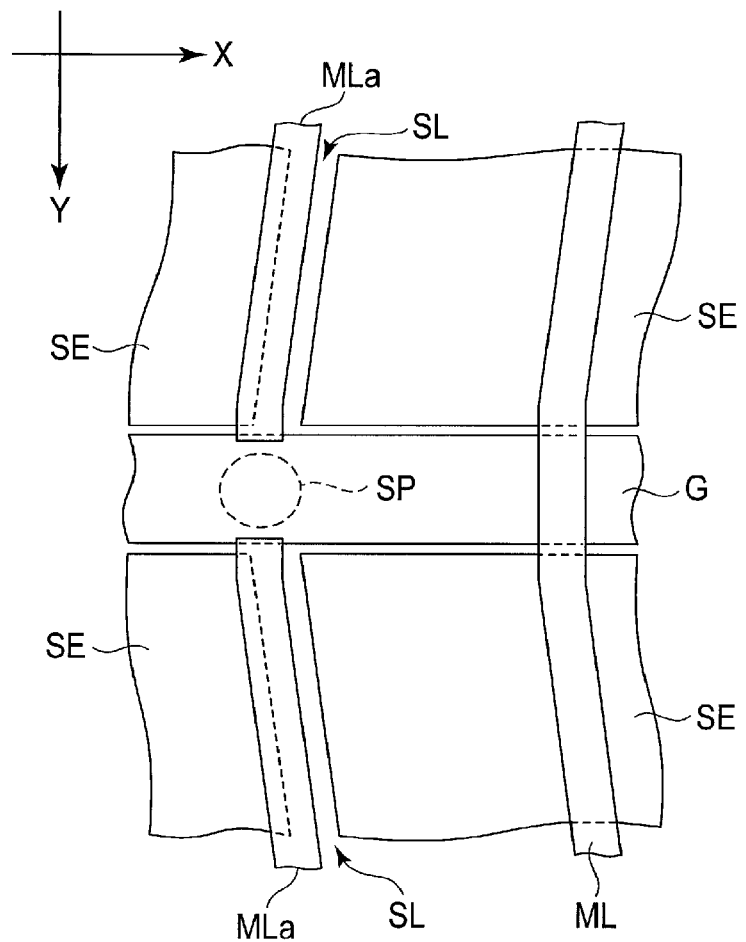
F I G. 11

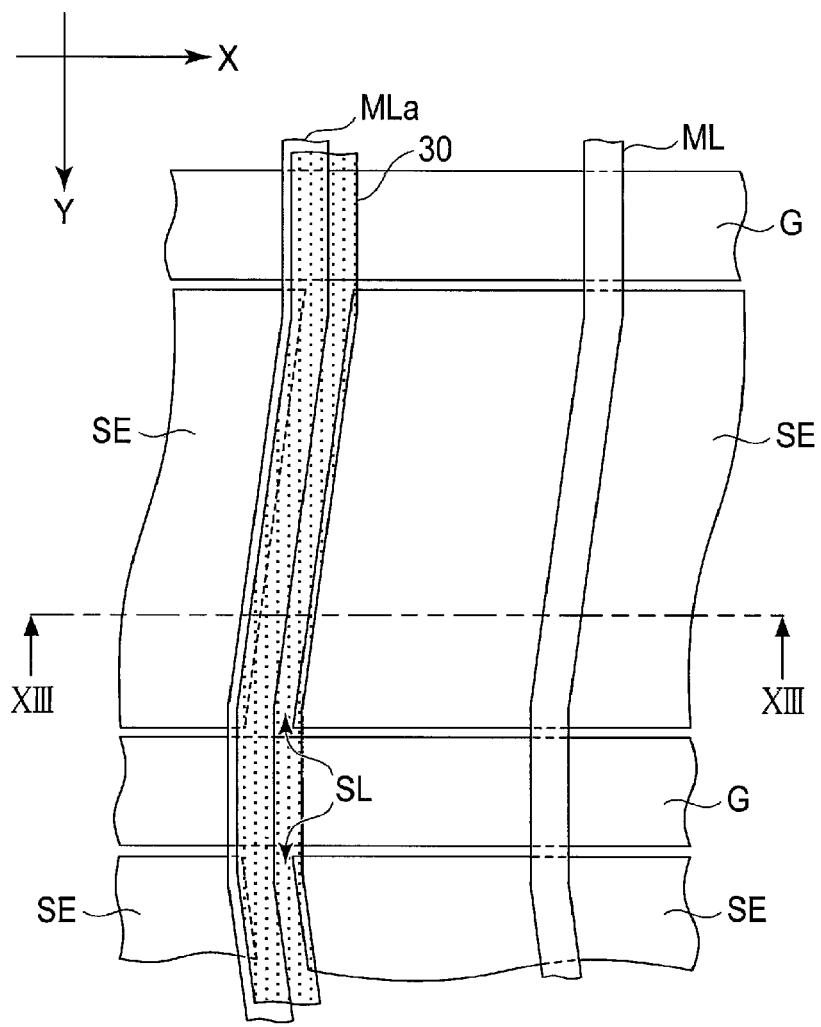
F I G. 12

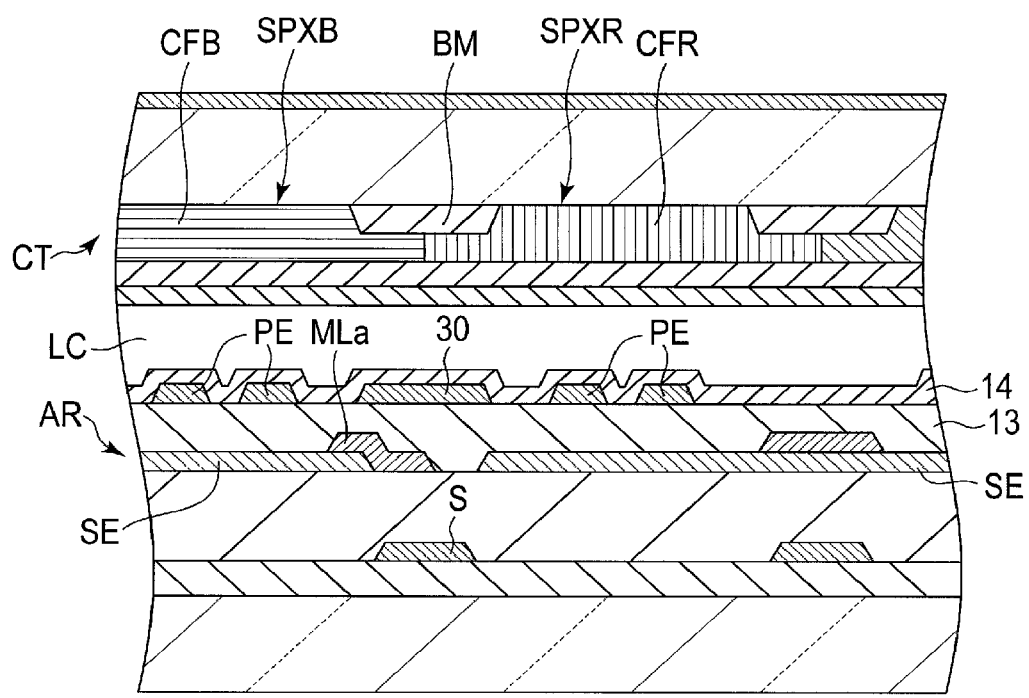
F I G. 13

DISPLAY DEVICE INCLUDING A PLURALITY OF METAL LINES IN CONTACT WITH A COMMON ELECTRODE

CROSS-REFERENCE TO RELATED APPLICATIONS

This application is based upon and claims the benefit of priority from Japanese Patent Application No. 2015-201909, filed Oct. 13, 2015, the entire contents of which are incorporated herein by reference.

FIELD

Embodiments described herein relate generally to a display device.

BACKGROUND

In general, as is known, a display device includes a pair of substrates and a liquid crystal layer enclosed between the substrates. In a liquid crystal display device, liquid crystal molecules of a liquid crystal layer are driven by an electric field produced between pixel electrodes provided in respective pixels and a common electrode provided over a plurality of pixels, to thereby display an image.

The common electrode is made up of electrodes (hereinafter referred to as structural electrodes) associated with the pixels. There is a case where structural electrodes are isolated from each other by slits. For example, the slits each extend along an image signal line (source line) for supplying an image signal to a switching element connected to a pixel electrode.

Furthermore, because of provision of metal lines electrically connected to the common electrode, the resistance of the common electrode can be reduced. The metal lines are formed opposite to portions of a light-shielding layer which correspond to the boundaries between the pixels. For example, they are formed along image signal lines.

In a conventional liquid crystal display device, in order to avoid occurrence of a short-circuit in adjacent structural electrodes, metal lines do not cover slits. Therefore, the pixels are classified into pixels each of which satisfies a positional relationship in which metal lines are provided on both ends of a pixel, and pixels each of which satisfies a positional relationship in which a metal line is provided on only one of both ends of a pixel. For example, the aperture ratio of the above former pixels (each satisfying the positional relationship in which metal lines are provided on the both ends of a pixel) can differ from that of the above latter pixels (each satisfying the positional relationship in which a metal line is provided on only one the both ends of a pixel). Therefore, there is a possibility that the color displayed by the pixels will be shifted from a target color.

In such a manner, the quality of a displayed image can be reduced depends on the arrangement of metal lines. It is therefore necessary to prevent reduction of the quality of a displayed image, which depends on the arrangement of the metal lines.

BRIEF DESCRIPTION OF THE DRAWINGS

FIG. 1 is a plan view illustrating a schematic structure of a liquid crystal display device according to a first embodiment.

FIG. 2 is a view schematically illustrating an equivalent circuit of the above liquid crystal display device.

FIG. 4 is a plan view schematically illustrating an example of a configuration which can be applied to the sub-pixels.

FIG. 6 is a plan view illustrating a modification of a common electrode comprising structural electrodes.

FIG. 7 is a plan view illustrating dummy slits in the common electrode as illustrated in FIG. 6.

FIG. 9 is a plan view for explaining dimensions related to the metal lines.

FIG. 11 is a plan view schematically illustrating a configuration according to the third embodiment.

FIG. 12 is a plan view schematically illustrating a configuration according to the fourth embodiment.

FIG. 13 is a view schematically illustrating an example of a cross section taken along line XIII-XIII in FIG. 12.

DETAILED DESCRIPTION

Figure 3:
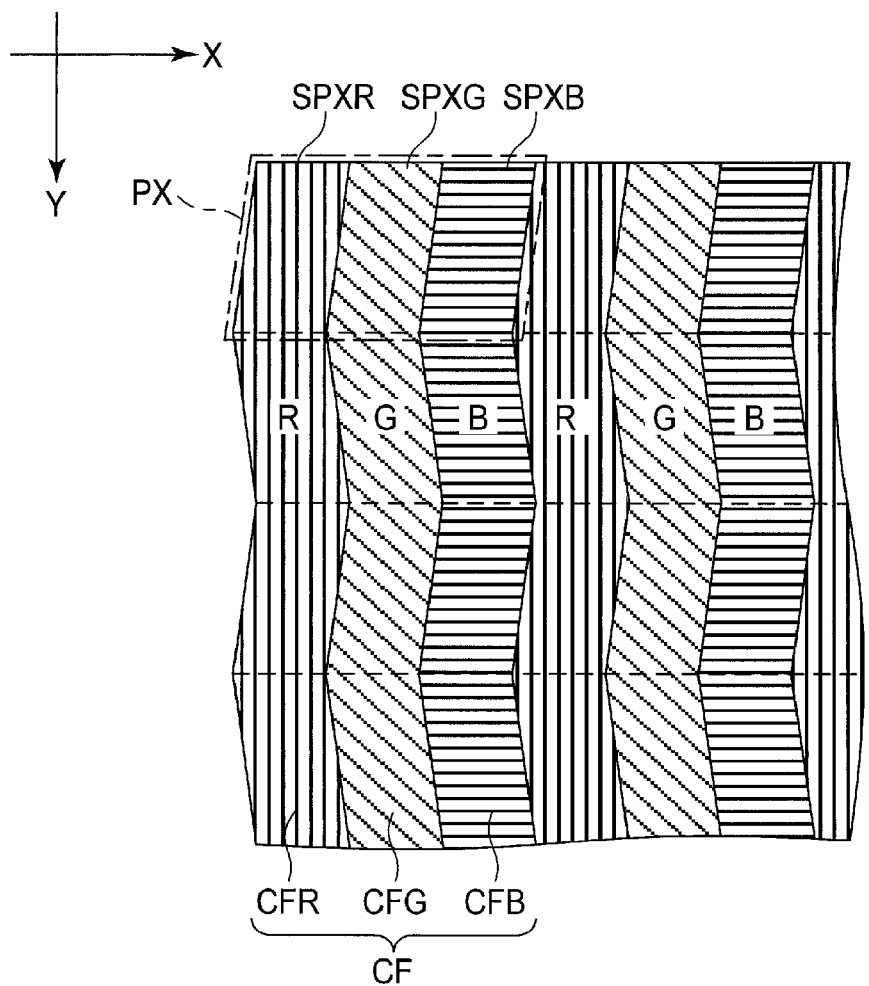
FIG. 3 is a plan view schematically illustrating a relationship between sub-pixels and a color filter in the liquid crystal display device.

In general, according to one embodiment, a display device comprises a plurality of image signal lines, a plurality of scanning signal lines, a plurality of pixels, a plurality of pixel electrodes formed in the plurality of pixels, respectively, a common electrode located opposite to the plurality of pixel electrodes, and a color filter located opposite to the pixels. The display device further comprises a plurality of metal lines which are in contact with the common electrode. The common electrode and the metal lines extend in a direction of extension of the image signal lines.

The plurality of image signal lines include a first image signal line and a second image signal line. The color filter includes a first filter having a first color and a second filter having a second color. The plurality of pixels includes first to fourth pixels, the first and second pixels being adjacent to each other, with the first image signal line interposed between the first and second pixels, the third and fourth pixels being adjacent to each other, with the second image signal line interposed between the third and fourth pixels. The common electrode includes first to fourth structural electrodes, the first and second structural electrodes being adjacent to each other, with a first slit interposed between the first and second structural electrodes, the third and fourth structural electrodes being adjacent to each other, with a second slit interposed between the third and fourth structural electrode. The plurality of metal lines include a first metal line and a second metal line.

As seen in plan view, the first filter overlaps with the first pixel and the third pixel, and the second filter overlaps with the second pixel and the fourth pixel. The first structural electrode overlaps with the first pixel, the second structural electrode overlaps with the second pixel, the third structural electrode overlaps with the third pixel, and the fourth structural electrode overlaps with the fourth pixel. The first slit extends between the first and second pixels in the direction of extension of the first image signal line, and the second slit extends between the third and fourth pixels in the direction of extension of the second image signal line. The first metal line is provided between the first and second structural electrodes to cover part of the first slit, and the second metal line is formed between the third and fourth structural electrodes to cover part of the second slit. A distance between the first metal line and the first structural electrode is shorter than that between the first metal line and the second structural electrode, and a distance between the second metal line and the fourth structural electrode is shorter than a distance between the second metal line and the third structural electrode.

By virtue of the above structure, it is possible to prevent reduction of the quality of a displayed image, which depends on the arrangement of the metal lines.

Embodiments will be explained with reference to the accompanying drawings.

The disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the drawings may be more schematic than in the actual modes, but they are mere examples, and do not limit the interpretation of the present invention. In some cases, in each of the drawings, reference numbers of identical or similar elements, which are successively disposed, are omitted. In the specification and drawings, components that fulfill same or similar functions are denoted by the same reference numeral and their overlapping descriptions may be omitted.

With respect to each of the embodiments, a liquid crystal display device having a touch detection function will be described as an example of a display device. However, each of the embodiments does not preclude the application of individual technical ideas disclosed in the embodiments to other types of display devices. As another type of display device, a self-luminous display device such as an organic electroluminescent display device or an electronic-paper display device including a cataphoretic element can be considered.

First Embodiment

FIG. 1 is a plan view illustrating a schematic configuration of a liquid crystal display device 1 according to a first embodiment. The liquid crystal display device 1 can be used in various devices such as a smartphone, a tablet device, a cell phone, a personal computer, a television receiver, a vehicle-mounted device, a games console, a wearable device, etc.

The liquid crystal display device 1 comprises a display panel 2, a plurality of common electrodes CE, a plurality of detection electrodes RX opposite to the common electrodes CE, a driver IC 3 functioning as a driver module, and a touch detector IC 4 functioning as a detection module.

The display panel 2 comprises a rectangular array substrate AR (first substrate) and a rectangular counter-substrate CT (second substrate) which has a smaller outer shape than that of the array substrate AR. In the example illustrated in FIG. 1, the array substrate AR and the counter-substrate CT are attached to each other, such that three sides of one of these substrates are aligned with three sides of the other. The array substrate AR includes a terminal area NA which does not face any part of the counter-substrate CT.

In a region in which the array substrate AR and the counter-substrate CT are located opposite to each other, the display panel 2 includes a display area DA for displaying an image and a frame area FA located between the display area DA and an end portion of the counter-substrate CT. The frame area FA surrounds the display area DA. In the example illustrated in FIG. 1, the display area DA is formed in the shape of a rectangle having short sides extending in a first direction X and long sides extending in the second direction Y. In the first embodiment, the first direction X and the second direction Y are perpendicular to each other; however, they may cross each other at an angle other than the right angle.

In the display area DA, the common electrodes CE extend in the second direction Y, and are arranged in the first direction X. The common electrodes CE can be formed of, for example, a transparent conductive material such as indium tin oxide (ITO). Also, the common electrodes CE are formed in, for example, the array substrate AR.

In the display area DA, the detection electrodes RX extend in the first direction X, and are arranged in the second direction Y. The detection electrodes RX can be formed of a transparent conductive material such as ITO or metal lines. The detection electrodes RX are formed on, for example, an outer surface of the counter-substrate CT (which is an opposite surface of a surface thereof which faces the array substrate AR).

The driver IC 3 executes a control regarding an image display, and is mounted on, for example, the terminal area NA. A first flexible printed circuit 6 is connected to a mounting terminal 5, and supplies image data to the display panel 2.

At an end portion of the counter-substrate CT which extends along the terminal area NA, a mounting terminal 7 is formed. To the mounting terminal 7, a second flexible printed circuit 8 is connected in order to output a detection signal from each of the detection electrodes RX. In the example illustrated in FIG. 1, the touch detector IC 4 is mounted on the second flexible printed circuit 8. The detection electrodes RX, for example, in the frame area FA, are connected to the mounting terminal 7 by detection lines DL formed on the surface of the counter-substrate CT.

The following explanation is related to an image display in the liquid crystal display device 1. FIG. 2 is a schematic view illustrating an equivalent circuit related to an image display. The liquid crystal display device 1 comprises a plurality of scanning signal lines (gate lines) G, a plurality of image signal lines (source lines) S intersecting the scanning signal lines G, a first gate driver GD1, a second gate driver GD2 and a source driver SD. The source driver SD is connected to the driver IC 3 by a plurality of video lines VL.

The scanning signal lines G, in the display area DA, extend in the first direction, and are arranged in the second direction Y. The image signal lines S, in the display area DA, extend in the second direction Y, and are arranged in the first direction X. The image signal lines S may linearly extend or may extend while curved.

The scanning signal lines G and the image signal lines S are formed in the array substrate AR. The scanning signal lines G are connected to the first gate driver GD1 and the second gate driver GD2. The image signal lines S are connected to the source driver SD.

In the example illustrated in FIG. 2, each of areas defined by the scanning signal lines C and the image signal lines S corresponds to a single sub-pixel SPX. For example, in the first embodiment, a red sub-pixel SPXR, a green sub-pixel SPXG and a blue sub-pixel SPXB form a single pixel PX. The pixel PX may further comprise a white or yellow sub-pixel. It should be noted that in the following, there is a case where a sub-pixel is referred to as a pixel.

The sub-pixels SPX each comprise a switching element SW, which is formed in the array substrate AR. The switching element SW is, for example, a thin-film transistor. The switching element SW is electrically connected to a scanning signal line G, an image signal line S and a pixel electrode PE. In an image display operation, a common voltage is applied to the common electrodes CE.

The first gate driver GD1 and the second gate driver GD2 supply scanning signals to the scanning signal lines G successively. The source driver SD is controlled by the driver IC 3 to selectively supply the image signal lines S with image signals. When a scanning signal line G connected to a switching element SW is supplied with a scanning signal line G, and an image signal line S connected to the above switching element SW is supplied with an image signal, a voltage corresponding to the image signal is applied to a pixel electrode PE. At this time, because of an electric field produced between the pixel electrode PE and a common electrode CE, alignment of liquid crystal molecules in a liquid crystal layer LC held between the array substrate AR and the counter-substrate CT varies from their initial alignment state in which no voltage is applied. By such an operation, an image is displayed in the display area DA.

The common electrodes CE function as electrodes for an image display operation and also as drive electrodes for detecting an object (conductor) such as the user's finger, which is in proximity to the display area DA. In a detection operation, the driver IC 3 supplies drive signals to the common electrodes CE successively. The detection electrodes RX are capacitively coupled to the common electrodes CE, and output detection signals associated with drive signals supplied to the common electrodes CE. A detection signal output from a detection electrode RX to which the object is not in proximity and that from a detection electrode RX to the object is in proximity have different waveforms. Based on such a detection signal, the touch detector IC 4 determines whether an object is in proximity to the display area DA or not, and detects the position of the object in the first direction X and the second direction Y.

It should be noted that the detection method explained above is a mere example, and another detection method can be applied. For example, it is possible to adopt a method of detecting an object which is in proximity to the display area DA, utilizing the capacitances (self-capacitances) of detection electrodes RX or common electrodes CE.

Sub-pixels SPX have the same colors as color filters CF included in the display panel 2. FIG. 3 is a plan view schematically illustrating a relationship between the color filters CF and the sub-pixels SPX. In the first embodiment, sub-pixels SPXR are continuously arranged in the second direction Y; and likewise, sub-pixels SPXG are continuously arranged in the second direction Y, and sub-pixels SPXB are continuously arranged in the second direction Y.

Each of the color filters CF includes a first color filter CFB, a second filter CFR and a third filter CFG. The filters CFB, CFR and CFG are formed of resin materials colored blue (first color), red (second color) and green (third color), respectively. For example, the filters CFB, CFR and CFG are formed in the shape of a band extending in the second direction Y, and as seen in plan view, they extend over the sub-pixels SPXB, the sub-pixels SPXR and the sub-pixels SPXG, which as described above, are arranged in the second direction Y. The filters CFB, CFR and CFG may be respectively formed for the sub-pixels SPXB, SPXR and SPXG.

It should be noted that the arrangement of the sub-pixels SPX is not limited to that illustrated in FIG. 3. For example, in order that sub-pixels of at least one of a group of sub-pixels SPXR, a group of sub-pixels SPXG and a group of sub-pixels SPXB be discontinuously arranged, sub-pixels SPX of adjacent pixels PX may be arranged in different manner. Furthermore, in addition to sub-pixels SPXR, SPXG and SPXB, each of pixels PX may further include one or more of sub-pixels SPXR, SPXG and SPXB, or include the above white or yellow sub-pixel SPX.

Next, the configuration of a sub-pixel SPX will be explained. FIG. 4 is a plan view schematically illustrating an example of a configuration which can be applied to a sub-pixel SPX. The sub-pixel SPX is a pixel defined by two adjacent scanning signal lines G and two adjacent image signal lines S. In the example illustrated in FIG. 4, image signal lines S extend in the second direction Y while partially curved.

The sub-pixel SPX comprises a pixel electrode PE including a slit PSL which is elongated in the second direction Y. The pixel electrode PE is formed of, for example, a transparent conductive material such as ITO or IZO. The shape of the pixel electrode PE is not limited to this. That is, the pixel electrode PE may include a plurality of slits PSL or no slit.

Opposite to the pixel electrode PE, an associated common electrode CE is provided. In the first embodiment, the common electrode CE is made up of a plurality of structural electrodes SE (see FIG. 5). In the example illustrated in FIG. 4, each of the structural electrodes SE is located between adjacent scanning signal lines G, and extends in the first direction X.

At the boundary between sub-pixels SPX adjacent to each other in the first direction X, a metal line ML is provided. The metal line ML is in contact with, for example, a structural electrode SE, and electrically connected to the structural electrode SE. The metal line ML extends in the direction of extension of an image signal line S while located opposite to the image signal line S.

The metal line ML is formed in a layer different from layers in which a scanning signal line G and the image signal line S are formed. In the example illustrated in FIG. 4, as seen in plan view, the metal line ML and the image signal line S are located in same line. However, as seen in plan view, the metal line ML and the image signal line S may be located to overlap with each other. For example, it is possible to adopt a structure in which the metal line ML is located over one side of the image signal line S and not over the other end of the image signals S.

The metal line ML can be formed of a metallic material such as molybdenum, tungsten, aluminum, titanium or copper, or an alloy containing such a metallic material, or the like. The metal line ML may have a single-layer structure or a multilayer structure in which layers formed of different materials are stacked together.

The scanning signal lines G, the image signal lines S, the pixel electrodes PE, the common electrodes CE and the metal lines ML are formed in, for example, the array substrate AR. In contrast, in the counter-substrate CT, a light-shielding layer (black matrix) BM is formed. In FIG. 4, the light-shielding layer BM is indicated by a one-dot chain line. As seen in plan view, portions of the light-shielding layer BM coincide with the scanning signal lines G, the image signal lines S and the metal lines ML, and includes openings located in the sub-pixels SPX. The light-shielding layer BM is also located over part of the pixel electrodes PE and part of the structural electrode SE and the switching elements SW formed as illustrated in FIG. 2.

Figure 5:
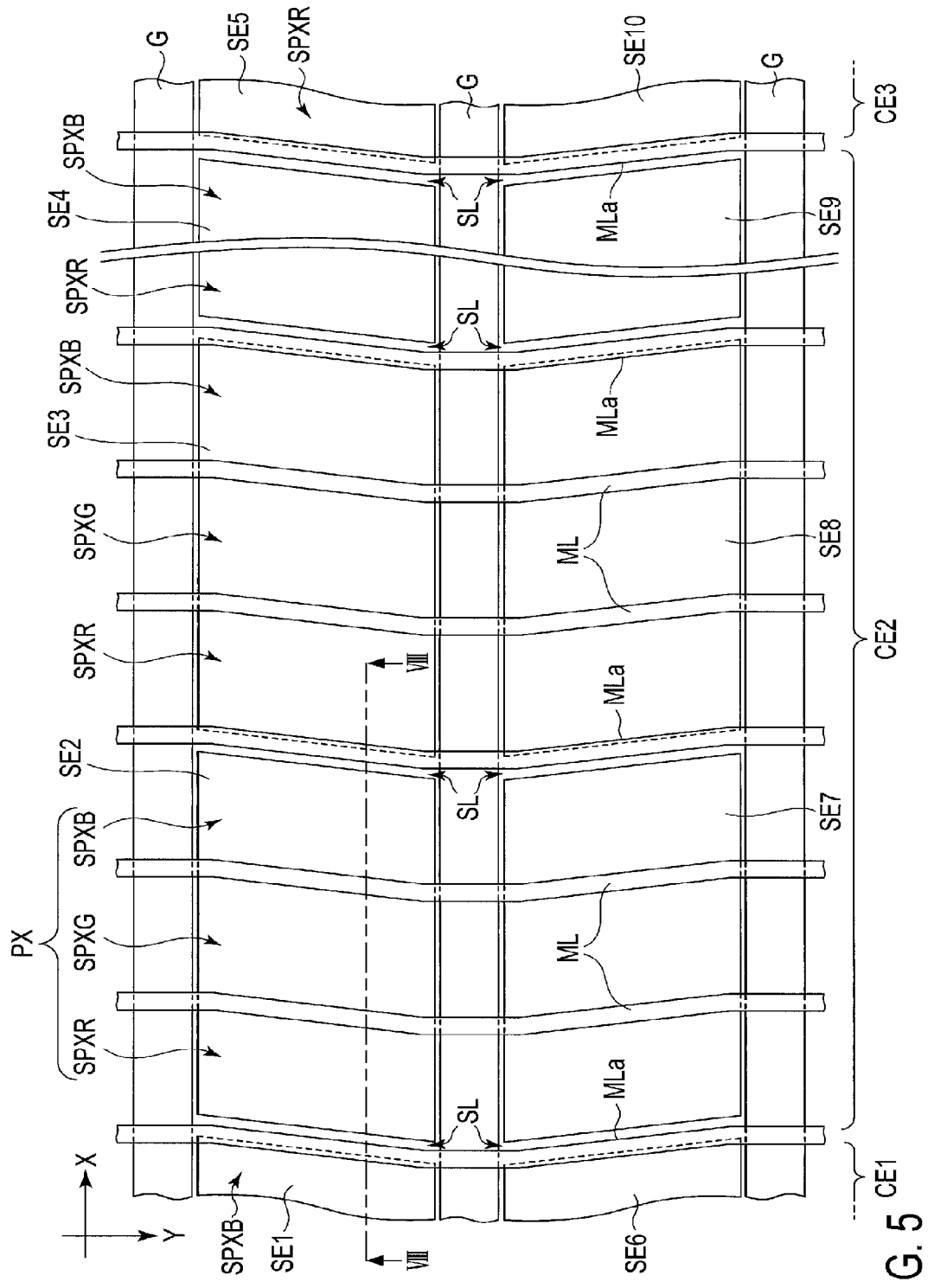
FIG. 5 is a plan view schematically illustrating the arrangement of metal lines and common electrodes in the liquid crystal display device.

Next, the relationship between the metal lines ML and the common electrodes CE will be explained in detail. FIG. 5 is a plan view schematically illustrating an example of the arrangement of metal lines ML and common electrodes CE (including structural electrodes SE). To be more specific, FIG. 5 illustrates metal lines ML and structural electrodes which are formed between three successive scanning signal lines G. Of the illustrated three scanning signal lines G, between an upper scanning signal line G and an intermediate scanning signal line G, sub-pixels SPX are formed to include switching elements SW which are controlled by, for example, the intermediate scanning signal line G. Also, sub-pixels formed between the intermediate scanning signal line G and lower scanning signal line G include switching elements SW which are controlled by, for example, the lower scanning signal line G.

Each of the structural electrodes SE, for example, as illustrated in FIG. 5, is located between adjacent scanning signal lines G, and is associated with a single pixel PX. That is, in the first embodiment, the structural electrodes SE are arranged for the pixels PX, respectively. However, the structural electrodes SE may be arranged such that a single structural electrode SE may be provided for two or more pixels PX arranged in the first direction X or the second direction Y. In FIG. 5, as a matter of convenience for explanation, the structural electrodes SE are denoted by different reference numerals (SE1 to SE10).

Between structural electrodes SE adjacent to each other in the first direction, a slit SL is formed. The slit SL is located between sub-pixels SPX to extend in the same direction as an image signal line S provided as illustrated in FIG. 4, etc., extends. In the first embodiment, as described above, the structural electrodes SE are provided for the associated pixels PX, respectively. Thus, each of the slits SL is provided between a blue sub-pixel SPXB included in an associated one of the pixels PX and a red sub-pixel SPXR included in a pixel PX adjacent to the above associated pixel PX.

Referring to FIG. 5, structural electrodes SE arranged in the second direction Y are physically separated from each other, but electrically connected to each other by metal lines ML. In such a manner, structural electrodes SE electrically connected by metal lines ML constitute a group; and adjacent groups each consisting of structural electrodes SE are electrically connected to each other, thereby forming a single common electrode CE. FIG. 5 illustrates by way of example the case where three groups of structural electrodes SE are continuously arranged in the first direction X to form a single a common electrode CE. To be more specific, common electrode CE1 is made up of a group consisting of structural electrodes SE1 and SE6 and two groups of structural electrodes SE, which are located leftward of the group consisting of structural electrodes SE1 and SE6; common electrode CE2 is made up of three groups, i.e., a group consisting of structural electrodes SE2 and SE7, a group consisting of structural electrodes SE3 and SE8 and a group consisting of structural electrodes SE8 and SE9; and a common electrode CE3 is made up of a group consisting of structural electrodes SE5 and SE10 and two groups of structural electrodes, which are located rightward of the group of consisting of structural electrodes SE5 and SE10. Furthermore, in a single common electrode CE, structural electrodes SE adjacent to each other in the direction of extension of scanning signal lines G (in the first direction) are electrically connected to each other in, for example, the frame area FA.

Structural electrodes SE arranged in the second direction Y may be formed integral with each other as illustrated in FIG. 6. In this case, structural electrodes SE forming a single common electrode CE, as illustrated in FIG. 7, may be electrically connected to each other by connection portions CP provided in the frame area FA. As illustrated in FIG. 7, the slits SL include ordinary slits SL and dummy slits (DSL). Structural electrodes SE which are adjacent to each other, with ordinary slits SL interposed between them, are not electrically connected to each other, whereas structural electrodes SE which are adjacent to each other, with dummy slits DSL interposed between them, are electrically connected to each other by connection portions CP.

Also, in the single common electrode CE, the structural electrodes SE adjacent to each other in the direction of extension of the scanning signal lines G (in the first direction) may be connected to each other in positions in the display area DA in which portions of the light-shielding layer BM are located as seen in plan view. Structural electrodes SE which are arranged in the direction of extension of image signal lines S (in the second direction Y), with slits SL interposed between them, are electrically connected to each other, whereas structural electrodes SE which are adjacent to each other in the first direction X, with slits SL interposed between them, include structural electrode SE electrically connected to each other and structural electrodes SE not electrically connected to each other.

It should be noted that the number of the above groups forming a single common electrode CE is not limited to three. That is, a single common electrode CE may be made up of a single group of structural electrodes SE, or it may be made up of two groups of structural electrodes SE or four or more groups of structural electrodes SE.

The metal lines ML are arranged such that a metal line ML located between sub-pixels SPXR and SPXG and a metal line ML located between sub-pixels SPXG and SPXB overlap with structural electrodes SE provided for a pixel PX including these sub-pixels SPXR, SPXG and SPXB, as seen in plan view.

In the following, the metal line ML located between sub-pixels SPXB and SPXR is referred to as a metal line MLa. The metal line MLa overlaps with one of structural electrodes SE which are adjacent to each other, with a slit SL interposed between them, as seen in plan view. Furthermore, the metal line MLa covers part of the slit SL.

In the example illustrated in FIG. 5, a metal line MLa between a pair of structural electrodes SE1 and SE6 and a pair of structural electrodes SE2 and SE7 overlaps with structural electrodes SE1 and SE6; a metal line MLa between a pair of structural electrodes SE2 and SE7 and a pair of structural electrodes SE3 and SE8 overlaps with structural electrodes SE3 and SE8; a metal line MLa between a pair of structural electrodes SE3 and SE8 and a pair of structural electrodes SE4 and SE9 overlaps with structural electrodes SE3 and SE8; and a metal line MLa between a pair of structural electrodes SE4 and SE9 and a pair of structural electrodes SE5 and SE10 overlaps with structural electrodes SE5 and SE10.

That is, in the first embodiment, metal lines MLa are arranged in the following first and second manners; and the first and second manners are alternately applied to metal lines MLa arranged in the first direction X.

(1) In the first manner, of a structural electrode SE (first structural electrode) over which a sub-pixel SPXB (first pixel) is located and a structural electrode SE (second structural electrode) over which a sub-pixel SPXR (second pixel) is located, the first structural electrode and a metal line MLa (first metal line) are arranged such that the first metal line overlaps with the first structural electrode. The first pixel and the second pixel are adjacent to each other, with a slit SL (first slit) interposed between them; and the first structural electrode and the second structural electrode are also adjacent to each other, with the first slit interposed between them.

(2) In the second manner, of a structural electrode SE (third structural electrode) over which a sub-pixel SPXB (third pixel) is located and a structural electrode SE (fourth structural electrode) over which a sub-pixel SPXR (fourth pixel) is located, the fourth structural electrode and a metal line MLa (second metal line) are arranged such that the second metal line overlaps with the fourth structural electrode. The third pixel and the fourth pixel are adjacent to each other, with a slit SL (second slit) interposed between them; and the third structural electrode and the fourth structural electrode are also adjacent to each other, with the second slit interposed between them. The third structural electrode may be identical to the second structural electrode.

In such a structure, structural electrodes SE each having ends overlapping with no metal line MLa, like structural electrodes SE2 and SE7, and structural electrodes SE each having both end portions overlapping with metal lines MLa, like structural electrodes SE3 and SE8, are alternately arranged in the first direction X.

It should be noted that FIG. 5 illustrates the layout of only an area in which three scanning signal lines G are provided. However, for example, all metal lines MLa are arranged in the same manner as metal lines MLa provided in the area in which the three scanning lines G are provided. Furthermore, FIG. 5 illustrates the case where the first and second manners are alternately applied to the metal lines MLa arranged in the direction X; however, of these metal lines MLa, adjacent metal lines MLa may be provided in the same manner, i.e., one of the first and second manners.

Figure 8:
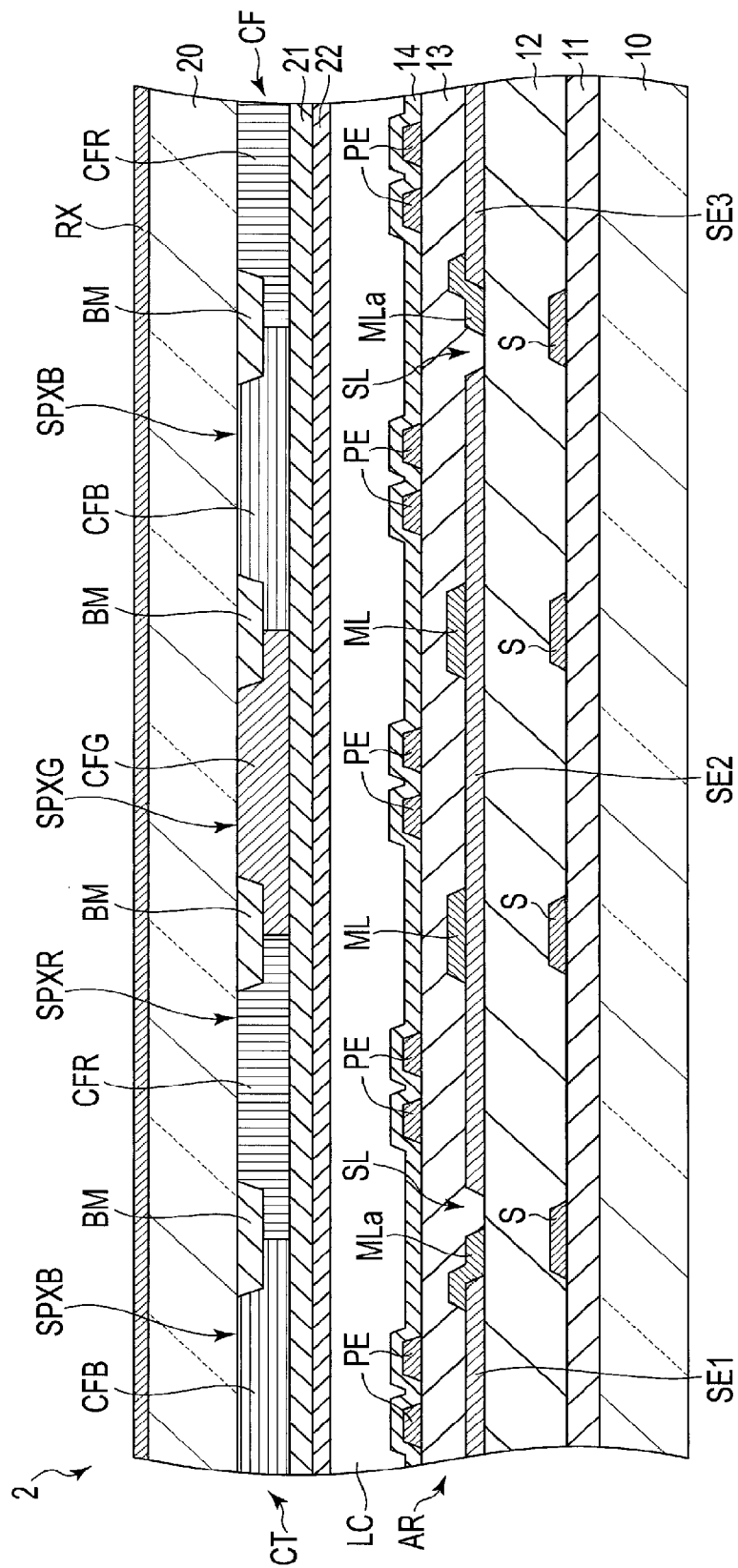
FIG. 8 is a view schematically showing an example of a cross section taken along line VIII-VIII in FIG. 5.

Next, the cross section of the display panel 2 will be explained. FIG. 8 is a view schematically illustrating an example of a cross section taken along line VIII-VIII in FIG. 5. The array substrate AR comprises a first insulating substrate 10 such as a glass substrate. On a surface of the first insulating substrate 10 which faces the counter-substrate CT, a first insulating layer 11 is formed; and on a surface of the first insulating layer 11 which faces the counter-substrate CT, the image signal lines S are formed. The first insulating layer 11 and the image signal lines S are covered with a second insulating layer 12.

The structural electrodes SE are formed on a surface of the second insulating layer 12 which faces the counter-substrate CT. The metal lines ML are formed on surfaces of the structural electrodes SE which face the counter-substrate CT. The metal lines ML and the structural electrodes SE are covered with a third insulating layer 13. The pixel electrodes PE are formed on a surface of the third insulating layer 13 which faces the counter-substrate CT. The pixel electrodes PE and the third insulating layer 13 are covered with a first alignment film 14.

The counter-substrate CT comprises a second insulating substrate 20 such as a glass substrate. On a surface of the second insulating substrate 20 which faces the array substrate AR, the light-shielding layer BM and color filters CF (filters CFR, CFG and CFB) are formed. As seen in plan view, the boundaries between the filters CFR, CFG and CFB coincide with portions of the light-shielding layer BM.

The color filters CF are covered with a planarization layer 21, and the planarization layer 21 is covered with a second alignment film 22. On an outer surface of the second insulating substrate 20 (which does not face the array substrate AR), the detection electrodes RX are formed. The position of the detection electrodes RX is not limited to this; that is, they may be formed on the surface of the second insulating substrate 20 which faces the array substrate AR. Between the first alignment film 14 and the second alignment film 22, the liquid crystal layer LC is enclosed.

The metal line MLa covers the end portion of one of structural electrodes SE which are adjacent to each other, with a slit SL interposed between them, and also covers part of the slit SL. In such a manner, in the example illustrated in FIG. 8, metal lines MLa are in contact with end portions of structural electrodes SE, and thus electrically connected to the structural electrodes SE. However, it is possible to adopt a structure in which each of the metal lines MLa is not in contact with any of associated structural electrodes SE which are adjacent to each other, with a slit SL interposed between them. In this case, for example, in the frame area FA, metal lines MLa and structural electrodes SE (common electrodes CE) may be electrically connected to each other. Also, in the display area DA, for example, in the vicinity of scanning signal lines G, metal lines MLa and structural electrodes SE may be electrically connected to each other.

Furthermore, the metal lines ML (including metal lines MLa) may be formed between the second insulating layer 12 and the structural electrodes SE. Also, in this case, the metal lines MLa and the structural electrodes SE can be electrically connected to each other.

Each of metal lines MLa provided in the above first manner, i.e., a metal line MLa provided between structural electrodes SE1 and SE2 as illustrated in FIG. 8, is provided such that as seen in plan view, an overlapping area of the metal line MLa and the first filter CFB is greater than that of the metal line MLa and the second filter CFR. Also, each of metal lines MLa provided in the above second manner, i.e., a metal line MLa provided between structural electrodes SE2 and SE3 as illustrated in FIG. 8, is provided such that as seen in plan view, an overlapping area of the metal line MLa and the second filter CFR is greater than that of the metal line MLa and the first filter CFB. By virtue of the above feature, it is possible to restrict a color shift which occurs when a viewing angle changes.

FIG. 9 is a plan view for explaining dimensions related to the metal lines ML. FIG. 9 illustrates a metal line MLa provided in the above first manner (on the left side in the figure), a metal line MLa provided in the above second manner (on the right side in the figure), and a metal line ML provided between these metal lines MLa.

The width of the overlapping area of the metal line MLa provided in the first manner and a slit SL as seen in plan view is Wa1. The width of a region of the slit SL which as seen in plan view, the metal line MLa is not located is Wa2, which is less than Wa1 (Wa1>Wa2). That is, in the example illustrated in FIG. 9, the metal line MLa covers more than half area of the slit SL.

The metal line MLa provided in the first manner is separated by distance d1 from one of structural electrodes SE which are adjacent to each other, with the slit SL interposed between them, the above one of the structural electrodes SE being electrically connected to the metal line MLa; that is, the distance between the metal line MLa and the one of the structural electrodes SE is d1. In contrast, the distance between the metal line MLa and the other structural electrode SE is d2 which is greater than d1 (d1<d2). It should be noted that in the first embodiment, the metal line MLa covers an end portion of the above one of the structural electrodes SE. Thus, d1=0.

In another respect, in the location of the slit SL, the metal line MLa is located closer to one of the structural electrodes SE, to which the metal line MLa is electrically connected. It should be noted that ". . . closer to one of the structural electrodes SE" means that the center line of the metal line MLa is closer to the above one of the structural electrodes SE than the center line of the slit SL.

The metal line MLa provided in the second manner also satisfies the same conditions (Wa1>Wa2 and d1<d2) as the metal line MLa provided in the first manner. In the example illustrated in FIG. 9, the metal line MLa provided in the second manner covers more than half area of the slit SL.

The width of the overlapping area of the metal line MLa and the slit SL must be set to prevent occurrence of a short-circuit in the adjacent structural electrodes SE. In contrast, without the need to consider such a constraint, the region of the metal line ML which is not located on the slit SL can be set to have a great width. Therefore, the width Wb1 of the metal line MLa may be set less than the width Wb2 of each of the metal lines ML (Wb1<Wb2).

The widths Wa1 and Wa2, the distances d1 and d2 and the width Wb1 which are set in association with the metal line MLa provided in the first manner may be equal to or different from those set in association with the metal line MLa provided in the second manner.

It should be noted that the slit SL between the adjacent structural electrodes SE arranged in the first direction X may be the above-mentioned dummy slit DSL. In the display area DA, although the dummy slit DSL cannot be distinguished from an ordinary slit SL, the structural electrodes SE adjacent to each other, with the dummy slit DSL interposed between them, are electrically connected to each other in the frame area FA as illustrated in FIG. 7. That is, it is not always necessary to prevent occurrence of a short-circuit in the structural electrodes SE adjacent to each other, with the dummy slit DSL interposed between them. Thus, the width of a metal line MLa covering the slit SL (dummy slit) between these structural electrodes SE may be set greater than that of a metal line MLa covering a slit SL corresponding to the boundary between common electrodes CE. Furthermore, the metal line MLa covering the dummy slit may contact both the adjacent structural electrodes SE by completely covering the dummy slit.

For example, in the display area DA, slits SL arranged in the first direction X are provided at a constant pitch Ps. In the first direction X, the width of each of the pixels PX is approximately 20 μm in the case where the pixels PX are those of a high-definition display device. In the first embodiment, since the structural electrodes SE are provided for the pixels PX, respectively, the pitch Ps can be set to 20 μm or more. However, there is a case where the slits SL influence a displayed image (it causes a color shift or a crosstalk streak to be described later). As such an influence, a pattern of color shifts or streaks appearing at the pitch Ps is visibly recognizable. However, if the pitch Ps of the slits SL is set to be extremely small, the pattern cannot be easily recognized by a person. In general, if the spatial frequency of the pattern of color shifts or streaks is approximately 150 μm, the influence of the pattern upon the quality of a displayed image is slight. It is therefore preferable that the pitch Ps be set to be 150 μm or less. Furthermore, if the pitch Ps is set to 100 μm or less, the influence of the pattern is very slight.

Next, it will be explained what advantages can be obtained by the first embodiment with reference to FIG. 8.

In the first embodiment, the metal lines MLa covering the slits SL are provided. If a metal line MLa were not provided close to a slit SL, the color displayed by a pixel PX could be shifted from a target color to another color in accordance with the viewing angle at which the display area DA is visually recognized. This is caused by the following: because of provision of no metal line MLa, in a region in which a sub-pixel SPXB is provided, light transmitted from an array substrate AR side passes through the second filter CFR located opposite to a sub-pixel SPXR, and in a region in which the sub-pixel SPXR is provided, light transmitted from the array substrate AR side passes through the first color filter CFB located opposite to the sub-pixel SPXB. At the boundary between the sub-pixels SPXR and SPXG and that between the sub-pixels SPXG and SPXB, metal lines ML function as light-shielding layers, and restrict or prevent such a color shift as described above.

By contrast, in the first embodiment, the metal lines MLa function as light-shielding layers as the metal lines ML, and can prevent occurrence of a color shift in sub-pixels SPXB and SPXR which are adjacent to each other, with slits SL interposed between them.

Furthermore, if a metal line MLa were not provided, an electric field would be produced between an image signal line S and a pixel electrode PE through a slit SL, and act on the liquid crystal layer LC, thereby forming a crosstalk streak corresponding to the shape of the slit SL, in a displayed image. In contrast, if a metal line MLa is provided as in the first embodiment, it functions as a shield to restrict or prevent production of an electric field. It is therefore also possible to restrict or prevent formation of the above streak.

In general, in order to prevent a short-circuit from occurring in structural electrodes SE which are adjacent to each other, with a slit SL interposed between them, a metal line MLa needs to be provided close to any of the structural electrodes SE. Thus, the metal line MLa is displaced from the boundary between sub-pixels SPXB and SPXR which are adjacent to each other, with the slit SL interposed between them. As a result, although the metal line MLa has a function of preventing a color shift and a function of effecting shielding against an electric field, these functions are sufficiently performed on one of the sub-pixels SPXB and SPXR, but not sufficiently performed on the other. If in the display area DA, all the metal lines MLa were arranged in either the first manner or the second manner, of all the sub-pixels SPX, only sub-pixels SPX on which the function of preventing a color shift, etc., is not sufficiently performed would be influenced by a color shift, etc. It would be therefore impossible to sufficiently improve a display quality.

By contrast, in the first embodiment, metal lines MLa arranged in the above first manner and metal lines MLa arranged in the above second manner are mixedly provided. Therefore, the influence of a color shift, etc., is dispersed in sub-pixels SPXB and SPXR, and as a result, the quality of an image displayed by the liquid crystal display device 1 can be improved.

In addition to the above advantages, the first embodiment can obtain various excellent advantages.

Second Embodiment

The second embodiment is a variation of the first embodiment. In the second embodiment, structural elements identical to or similar to those of the first embodiment will be denoted by the same reference numbers. Of the structural elements of the first embodiment, structural elements not referred to in the following explanation are also applied to the second embodiment and are the same as those of the first embodiment.

Figure 10:
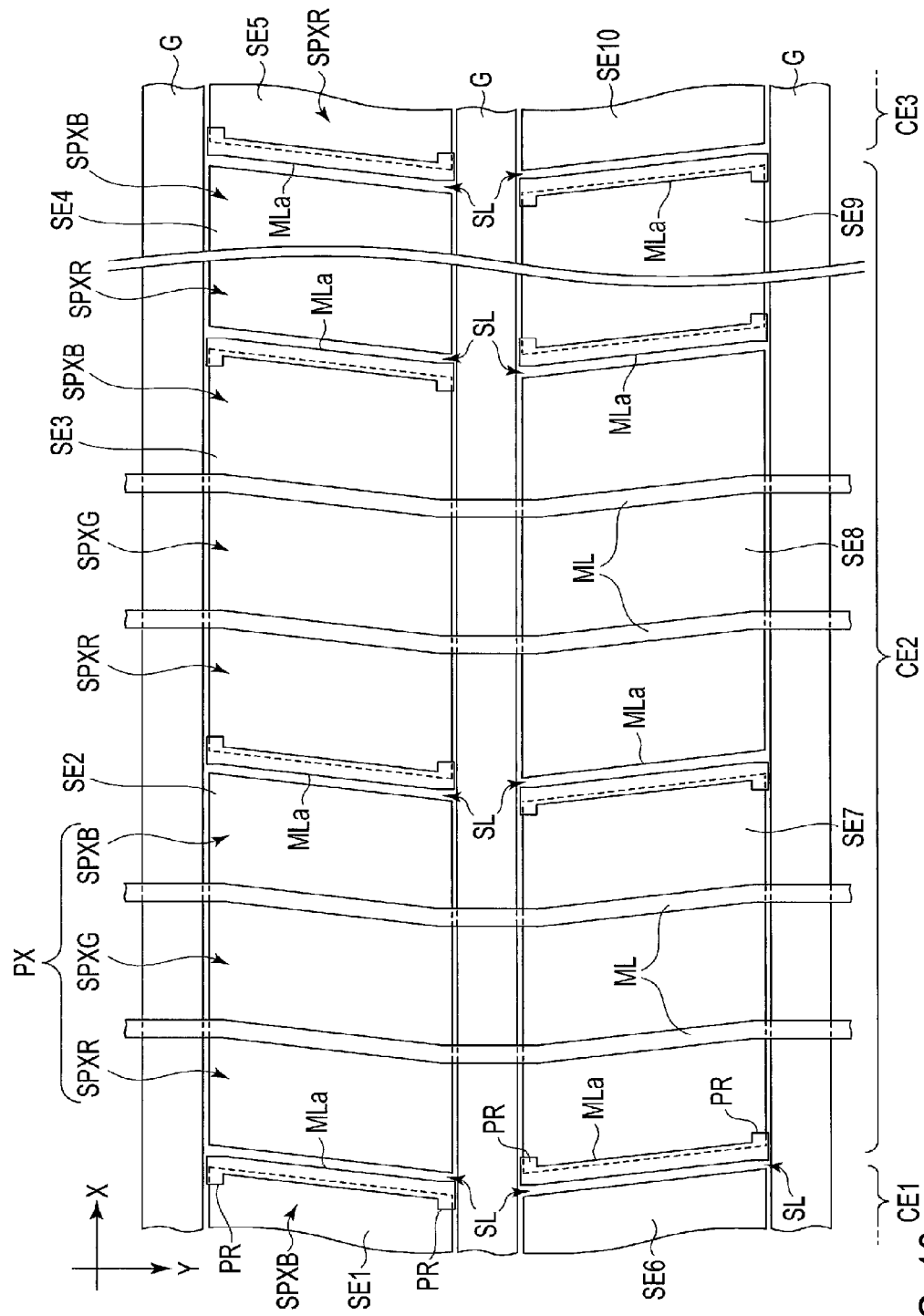
FIG. 10 is a plan view schematically illustrating a configuration according to the second embodiment.

FIG. 10 is a plan view schematically illustrating an example of the arrangement of metal lines ML and common electrodes CE (including structural electrodes SE) in the second embodiment. In the example illustrated in FIG. 10, metal lines ML are not provided over scanning signal lines G. To be more specific, the metal lines MLa are dividedly arranged in the second direction Y.

In the second embodiment, the above first and second manners can be applied to the metal lines MLa arranged in the second direction Y (or the direction of extension of image signal lines S). More specifically, metal lines MLa are arranged such that in a slit SL, a metal line MLa overlaps with a structural electrode SE located opposite to a sub-pixel SPXB, and in a slit SL adjacent to the above slit SL in the second direction Y, a metal line MLa overlaps a structural electrode SE located opposite to a sub-pixels SPXR.

Such a structure includes: structural electrodes SE each of which overlaps no metal lines MLa at its both end portions, like for example, structural electrodes SE2 and SE8; and structural electrodes SE each of which overlaps metal lines MLa at its both end portions, respectively, like structural electrodes SE3 and SE7. The former structural electrodes SE (for example, structural electrodes SE2 and SE8) and the latter structural electrodes SE (for example, structural electrodes SE3 and SE7) are alternately arranged in both the first direction X and the second direction Y. It should be noted that in the example illustrated in FIG. 10, the first and second manners are alternately applied to the metal lines MLa arranged in the first direction X and also to the metal lines MLa arranged in the second direction; however, it may be set that the first and second manners are alternately applied to only the metal lines MLa arranged in the second direction Y, and only one of the first and second manners is applied to the metal lines MLa arranged in the first direction X. Furthermore, the metal lines MLa may include metal lines MLa which are adjacent to each other in the first direction X or the second direction Y and which successively adopt the first manner or the second manner. It should be noted that in the example illustrated in FIG. 10, a metal line MLa associated with structural electrode SE1 and a metal line MLa associated with structural electrode SE6 are divided; however, they may be combined into a single metal line MLa.

In the example illustrated in FIG. 10, the width of a portion of each of metal lines MLa which is located at the boundary between sub-pixels SPX arranged in the second direction Y is different from that of the other portion of each metal line MLa. To be more specific, each metal line MLa includes projection portions PR which are formed in the vicinity of both end portions of an associated sub-pixel SPX which are located at ends thereof in the second direction Y. Each projection portion PR extend from an end portion of an associated structural element SE, which overlaps with each metal line MLa, toward another end portion of the structural element SE. Therefore, portions of each metal line MLa which correspond to the both end portions of the above sub-pixel SPX which are located at ends thereof in the second direction Y have a greater width than that of the other portion of each metal line MLa, i.e., that of an intermediate portion other than the projection portions PR. The projection portions overlap with, for example, a light-shielding layer BM as seen in plan view. In such a structure, the projection portions PR do not reduce the aperture area of the sub-pixel SPX. It should be noted that in the example illustrated in FIG. 10, a metal line MLa associated with structural electrode SE1 and a metal line MLa associated with structural electrode SE6 are divided; however, they may be combined into a single metal line MLa without removing the projection portions PR.

Also, in the case where metal lines MLa are provided for the sub-pixels, respectively, as illustrated in FIG. 10, it may be set that at only one end portion of each of the metal lines MLa, a projection portion is provided. In the example illustrated in FIG. 10, the intermediate portion of each metal line MLa also overlaps with the associated structural electrode SE; however, the intermediate portion may be located not to overlap with the structural electrode SE. Even in this case, as long as the projection portion or portions PR overlap with the structural electrode SE, each metal line MLa can be electrically connected to the structural electrode SE.

In the above second embodiment, in addition to the above first and second manners, the following manners are applied as the manners of the arrangement of the metal lines MLa:

(3) In a third manner, of a structural electrode SE (fifth structural electrode) over which a sub-pixel SPXB (fifth pixel) is provided and a structural electrode SE (sixth structural electrode) over which a sub-pixel SPXR (sixth pixel) is provided, the sixth structural electrode and a metal line MLa (third metal line) are arranged such that the third metal line overlaps with the sixth structural electrode. The fifth pixel and the sixth pixel are adjacent to each other, with a slit SL (third slit) interposed between them; and the fifth structural electrode and the sixth structural electrode are also adjacent to each other, with the third slit interposed between them.

(4) In a fourth manner, of a structural electrode SE (seventh structural electrode) over which a sub-pixel SPXB (seventh pixel) is provided and a structural electrode SE (eighth structural electrode) over which a sub-pixel SPXR (eighth pixel) is provided, the seventh structural electrode and a metal line MLa (fourth metal line) are arranged such that the fourth metal line overlaps with the seventh structural electrode. The seventh pixel and the eighth pixel are adjacent to each other, with a slit SL (fourth slit) interposed between them; and the seventh structural electrode and the eighth structural electrode are also adjacent to each other, with the fourth slit interposed between them. The seventh structural electrode may be identical to the sixth structural electrode.

For example, the first to fourth pixels include switching elements SW which are controlled by an associated scanning signal line G (first scanning signal line); and the fifth to eighth pixels include switching elements SW which are controlled by a scanning signal line G (second scanning signal line) adjacent to the first scanning signal line. The relationship between structural electrodes SE and metal lines MLa arranged in the third and fourth manners is the same as that explained with reference to FIG. 9.

For example, the distance between the first pixel and the fifth pixel is less than that between the first pixel and the seventh pixel; and that between the third pixel and the seventh pixel is less than that between the first and fifth pixels. An image signal line S (first image signal line) located opposite to the first metal line and an image signal line S (third image signal line) located opposite to the third metal line may be identical to each other. Also, an image signal line S (second image signal line) located opposite to the second metal line and an image signal line S (fourth image signal line) located opposite to the fourth metal line may be identical to each other.

Furthermore, in the example illustrated in FIG. 10, the first metal line includes projection portions PR (first projection portions) projecting toward the first structural electrode; the second metal line includes projection portions PR (second projection portions) projecting toward the fourth structural electrode; the third metal line includes projection portions PR (third projection portions) projecting toward the sixth structural electrode; and the fourth metal line includes projection portions PR (fourth projection portions) projecting toward the seventh structural electrode.

If metal lines MLa are provided as in the second embodiment, the influence of the above color shift and crosstalk streak can be dispersed not only in the first direction X but in the second direction Y. Thereby, it is possible to further improve the quality of an image displayed by the liquid crystal display device 1.

Furthermore, since each metal line MLa is formed to include a portion having a greater width than that of the projection portion or portions PR, an electrical connection between each metal line MLa and the associated structural electrode SE can be reliably ensured. Thereby, each metal line MLa and the structural electrode SE are prevented from being floated away from each other without contacting each other, due to a manufacturing error or the like.

It should be noted that FIG. 10 illustrates by way of example the case where each metal line MLa extends between adjacent scanning signal lines G in such a way as to overlap with an end portion of the structural electrode SE. However, it may be set that each metal line MLa extends over structural electrodes SE arranged in the second direction, and overlap with the structural electrodes SE at end portions thereof.

Third Embodiment

The third embodiment will be explained. In the third embodiment, structural elements identical to or similar to those of the first embodiment will be denoted by the same reference numbers. Of the structural elements of the first embodiment, structural elements not referred to in the following explanation are also applied to the third embodiment and are the same as those of the first embodiment.

FIG. 11 is a plan view schematically illustrating a configuration of each of metal lines ML according to the third embodiment. In the third embodiment, basically, the metal lines MLa continuously extends along image signal lines S as in the first embodiment. However, to be more specific, as seen in the plan view of FIG. 11, metal lines MLa are provided as divided metal lines MLa in the vicinity of a spacer SP so as not to overlap with the spacer SP.

Between an array substrate AR and a counter-substrate CT, a plurality of spacers SP are disposed to provide cell gaps between a first alignment film 14 and a second alignment film 22. The spacers SP may be provided to extend from either the array substrate AR or the counter-substrate CT. The position of each spacer SP is located in an overlapping area of, for example an associated scanning signal line G, an associated image signal line S and a light-shielding layer BM.

In the example illustrated in FIG. 11, each of the metal lines MLa is divided in two in the vicinity of the spacer SP. However, metal lines ML other than the metal lines MLa, may be provided as divided metal lines in the vicinity of spacers SP. In the display area DA, for example, metal lines ML (including metal lines MLa) are formed such that they do not overlap with any of all the spacers SP.

For example, the spacers SP have the same height. Therefore, if in the display area DA, spacers SP overlapping with metal lines ML and spacers SP not overlapping with any of the metal lines ML were mixedly provided, the cell gaps provided by the spacers SP overlapping with the metal lines ML would be different from those provided by the spacers SP not overlapping with the metal lines ML by the thickness of part of the metal lines ML which overlap with the cell gaps lines. In such a case, it is impossible to accurately determine the amount of liquid crystal which is dropped between the array substrate AR and the counter-substrate CT to form a liquid crystal layer LC.

By contrast, if the spacers SP are provided such that none of the spacers SP overlap with any of the metal lines ML, it prevents cell gaps from varying because of the metal lines ML. Thus, it is possible to accurately determine the amount of liquid crystal to be dropped. It should be noted that also in the case where all the spacers SP are provided to overlap with the metal lines ML, cell gaps are provided without varying because of the metal lines ML. It is therefore possible to obtain the same advantage as in the case where none of the spacers SP overlap with any of the metal lines ML.

Fourth Embodiment

The fourth embodiment will be explained. In the fourth embodiment, structural elements identical to or similar to those of the first embodiment will be denoted by the same reference numbers. Of the structural elements of the first embodiment, structural elements not referred to in the following explanation are also applied to the fourth embodiment and are the same as those of the first embodiment.

FIG. 12 is a plan view schematically illustrating a configuration according to the fourth embodiment. In the fourth embodiment, shield electrodes 30 are further added to the configuration according to the first embodiment. The shield electrodes 30 are formed of a transparent conductive material such as ITO. The potential of each of the shield electrodes 30 is arbitrary, but equal to, for example, that of a common electrode CE. To each shield electrode 30, a common voltage is applied.

The shield electrodes 30 extend along with metal lines MLa in the direction of extension of image signal lines S. In the example illustrated in FIG. 12, a shield electrode 30 covers the entire region of a slit SL. As another example, the shield electrode 30 may be provided to cover part of the slit SL which is not covered by the metal line MLa and not to cover part of the slit SL which is covered by the metal line MLa. Also, in the example illustrated in FIG. 12, the shield electrode 30 overlaps with the metal line MLa; however, it may be formed to cover the entire metal line MLa. In this case, the center line of the shield electrode 30 and that of the metal line MLa may be coincident with each other.

In the example illustrated in FIG. 12, the width of the shield electrode 30 is constant. However, the width of the shield electrode 30 may vary in the direction of extension thereof such that for example, the width of part covering the slit SL is great and that of part covering the scanning signal line G is small.

FIG. 13 is a view schematically illustrating an example of a cross section taken along line XIII-XIII in FIG. 12. In the example illustrated in FIG. 13, the shield electrode 30 is formed in the same layer as pixel electrodes PE; that is, it is formed between a third insulating layer 13 and a first alignment film 14. The shield electrode 30 is located opposite to a light-shielding layer BM.

It should be noted that the shield electrode 30 may be provided in a layer different from a layer where the pixel electrodes PE are formed. For example, it may be set that the third insulating layer 13 is divided into two layers, and the shield electrode 30 is provided between these two layers.

The metal line MLa does not completely cover the slit SL. Therefore, there is a possibility that through part of the slit SL which is not covered by the metal line MLa, an electric field will be produced between the image signal line S and pixel electrode PE, and act on a liquid crystal layer LC. However, since the shield electrode 30 is provided, it can prevent production of an electric field which could not be prevented by the metal line MLa solely. It is therefore possible to further improve the quality of an image displayed by the liquid crystal display device 1.

While certain embodiments have been described, they have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

For example, the structures of the above embodiments can be combined arbitrarily.

Furthermore, with respect to each of the embodiments, as the liquid crystal display device 1, a liquid crystal display device having a touch detection function is explained above by way of example. However, the technical concepts described above with respect to the embodiments can also be applied to a display device not having a touch detection function.

Also, with respect to the embodiments, the case where a slit SL and a metal line MLa are provided between a blue (first color) sub-pixel SPXB and a red (second color) sub-pixel SPXR is explained above by way of example. However, the slit SL may be provided between sub-pixels SPXR and SPXG or between sub-pixels SPXG and SPXB. That is, as the first and second colors, colors other than blue and red can be selected.

What is claimed is:

1. A display device comprising a plurality of image signal lines, a plurality of scanning signal lines, a plurality of pixels, a plurality of pixel electrodes formed in the plurality of pixels, respectively, a common electrode located opposite to the plurality of pixel electrodes, and a color filter located opposite to the pixels,
wherein:
the display device comprises a plurality of metal lines which are in contact with the common electrode;
the common electrode and the metal lines extend in a direction of extension of the image signal lines;
the plurality of image signal lines include a first image signal line and a second image signal line;
the color filter includes a first filter having a first color and a second filter having a second color;
the plurality of pixels includes first to fourth pixels, the first and second pixels being adjacent to each other, with the first image signal line interposed between the first and second pixels, the third and fourth pixels being adjacent to each other, with the second image signal line interposed between the third and fourth pixels;
the common electrode includes first to fourth structural electrodes, the first and second structural electrodes being adjacent to each other, with a first slit interposed between the first and second structural electrodes, the third and fourth structural electrodes being adjacent to each other, with a second slit interposed between the third and fourth structural electrode;
the plurality of metal lines include a first metal line and a second metal line, as seen in plan view, the first filter overlaps with the first pixel and the third pixel, and the second filter overlaps with the second pixel and the fourth pixel;
as seen in plan view, the first structural electrode overlaps with the first pixel, the second structural electrode overlaps with the second pixel, the third structural electrode overlaps with the third pixel, and the fourth structural electrode overlaps with the fourth pixel;
the first slit extends between the first and second pixels in the direction of extension of the first image signal line, and the second slit extends between the third and fourth pixels in the direction of extension of the second image signal line;
the first metal line is provided between the first and second structural electrodes to cover part of the first slit, and the second metal line is formed between the third and fourth structural electrodes to cover part of the second slit; and
a distance between the first metal line and the first structural electrode is shorter than that between the first metal line and the second structural electrode, and a distance between the second metal line and the fourth structural electrode is shorter than a distance between the second metal line and the third structural electrode.

2. The display device of claim 1, wherein the first metal line covers an end portion of the first structural electrode, and is separated from the second structural electrode,
the second metal line covers an end portion of the fourth structural electrode, and is separated from the third structural electrode.

3. The display device of claim 1, wherein the first metal line covers more than half area of the first slit, and the second metal line covers more than half area of the second slit.

4. The display device of claim 1, wherein:
as seen in plan view, an overlapping area of the first metal line and the first filter is greater than that of the first metal line and the second filter; and
as seen in plan view, an overlapping area of the second metal line and the second filter is greater than that of the second metal line and the first filter.

5. The display device of claim 1, wherein the plurality of scanning signal lines include a first scanning signal line, and the first pixel, the second pixel, the third pixel and the fourth pixels include respective switching elements which are controlled by the first scanning signal line.

6. The display device of claim 1, wherein the first metal line includes a first projection portion projecting toward the first structural electrode, and
the second metal line includes a second projection portion projecting toward the fourth structural electrode.

7. The display device of claim 5, wherein:
the plurality of image signal lines include a third image signal line and a fourth image signal line;
the plurality of scanning signal lines includes a second scanning signal line;
the plurality of pixels include a fifth pixel and a sixth pixel which are adjacent to each other, with one of the image signal lines interposed between the fifth and sixth pixels, and a seventh pixel and an eighth pixel which are adjacent to each other, with one of the image signal lines interposed between the seventh and eighth pixels;
the fifth pixel, the sixth pixel, the seventh pixel and the eighth pixels include respective switching elements which are controlled by the second scanning signal line;

the common electrode includes fifth to eighth structural electrodes, the fifth and sixth structural electrodes being adjacent to each other, with a third slit interposed between the fifth and sixth structural electrodes, the seventh and eighth structural electrodes being adjacent to each other, with a fourth slit interposed between the seventh and eighth structural electrode;

the plurality of metal lines include a third metal line and a fourth metal line;

as seen in plan view, the first filter overlaps with the fifth pixel and the seventh pixel, and the second filter overlaps with the sixth pixel and the eighth pixel;

the third slit extends between the fifth and sixth pixels in the direction of extension of the third image signal line, and the fourth slit extends between the seventh and eighth pixels in the direction of extension of the fourth image signal line;

a distance between the first pixel and the fifth pixel is shorter than that between the first pixel and the seventh pixel;

a distance between the third pixel and the seventh pixel is shorter than a distance between the third pixel and the fifth pixel;

the third metal line is provided between the fifth structural electrode and the sixth structural electrode to cover part of the third slit, and the fourth metal line is formed between the seventh structural electrode and the eighth structural electrode to cover part of the fourth slit; and a distance between the third metal line and the sixth structural electrode is shorter than that between the third metal line and the fifth structural electrode, and a distance between the fourth metal line and the seventh structural electrode is shorter than a distance between the fourth metal line and the eighth structural electrode.

8. The display device of claim 7, wherein:
the first scanning signal line and the second scanning signal line are adjacent to each other; and
the first image signal line and the third image signal line are identical to each other; and the second image signal line and the fourth image signal line are identical to each other.

9. The display device of claim 7, wherein:
the third metal line includes a third projection portion projecting toward the sixth structural electrode; and
the fourth metal line includes a fourth projection portion projecting toward the seventh structural electrode.

10. The display device of claim 1, wherein at least one of an electrical connection between the first structural electrode and the second structural electrode and an electrical connection between the third structural electrode and the fourth structural electrode is established.

11. The display device of claim 10, further comprising a display area in which the plurality of pixels are arranged, and a frame area surrounding the display area, wherein at least one of the electrical connection between the first structural electrode and the second structural electrode and the electrical connection between the third structural electrode and the fourth structural electrode is established in the frame area.

12. The display device of claim 1, wherein:
the plurality of metal lines include a fifth metal line,
as seen in plan view, the fifth metal line overlaps with any of the first structural electrode;
the second structural electrode, the third structural electrode and the fourth structural electrode, and overlaps with neither the first slit nor the second slit; and
a width of the fifth metal line is greater than that of at least one of the first metal line and the second metal line.

13. The display device of claim 1, wherein:
the common electrode includes: a plurality of structural electrodes which include the first structural electrode, the second structural electrode, the third structural electrode and the fourth structural electrode; and a plurality of slits which are provided between the structural electrodes, and include the first slit and the second slit;
the plurality of slits extend in the direction of extension of the image signal lines, and are arranged in a direction of extension of the scanning signal lines; and
a distance between any adjacent two of the slits falls within a range of 20 to 150 μm.

14. The display device of claim 1, further comprising a shield electrode formed between adjacent ones of the pixel electrodes and in a layer where the pixel electrodes are formed,
wherein the shield electrode has the same potential as the common electrode, and as seen in plan view, overlaps with at least one of the first slit and the second slit.

15. The display device of claim 1, wherein at least one of the first metal line and the second metal line has a wide portion located at a boundary between pixels arranged in the direction of extension of the image signal lines, and a width of the wide portion is greater than that of the other portion of the at least one of the first and second metal lines.

16. The display device of claim 1, further comprising:
a first substrate comprising the plurality of image signal lines, the plurality of scanning signal lines, the plurality of pixel electrodes, the common electrode and the plurality of metal lines;
a second substrate opposite to the first substrate; and
a spacer provided between the first substrate and the second substrate,
wherein the metal lines are opposite to the image signal lines, and extend in the direction of extension of the image signal lines, and
as seen in plan view, the spacer overlaps with one of the image signal lines, and does not overlap with the metal lines.

* * * * *